United States Patent [19]  
Lin et al.

[11] Patent Number: 4,621,131  
[45] Date of Patent: Nov. 4, 1986

[54] POLYESTERS DERIVED FROM 2,2-DIMETHYL-4-METHYLENEGLUTARIC ACID AND COATINGS PREPARED THEREFROM

[75] Inventors: Ju-Chui Lin, Strongsville; Gary M. Carlson, Dublin; Kirk J. Abbey, Seville, all of Ohio

[73] Assignee: SCM Corporation, New York, N.Y.

[21] Appl. No.: 826,690

[22] Filed: Feb. 6, 1986

[51] Int. Cl.⁴ .................. C08G 63/02; C08G 63/54
[52] U.S. Cl. .................................. 528/192; 524/599; 528/176; 528/194; 528/195; 528/272; 528/302; 528/303
[58] Field of Search ............... 524/599; 528/176, 192, 528/194, 195, 272, 302, 303

[56] References Cited

U.S. PATENT DOCUMENTS 4,523,007  6/1985  Schipfer et al. ............... 524/599 X

*Primary Examiner*—Lucille M. Phynes
*Attorney, Agent, or Firm*—A. Joseph Gibbons; Thomas M. Schmitz

[57] ABSTRACT

Polyesters containing tertiary ester linkages and pendant methylene unsaturation along the polymer chain are prepared from dialkyl 2,2-dimethyl-4-methyleneglutarate by transesterification with sterically structured polyols, preferably neopentyl glycol. The resultant sterically hindered polyesters are useful as hardeners and resin binders for high solids coatings.

7 Claims, No Drawings

POLYESTERS DERIVED FROM 2,2-DIMETHYL-4-METHYLENEGLUTARIC ACID AND COATINGS PREPARED THEREFROM

This invention relates to improved polyesters containing tertiary ester linkages useful in high solids coatings and based on dimers of methyl methacrylate reacted with polyols, preferably diols, under transesterification catalysis.

BACKGROUND OF THE INVENTION

The preparation of dimethyl 2,2-dimethyl-4-methylene glutarate (DMDMMG) is shown in commonly assigned U.S. Pat. No. 4,547,323, issued Oct. 15, 1985. Commonly assigned copending application Ser. No. 749,310 filed June 20, 1985 relates to the polymerization of specific dimethacrylate esters of a diol to give methacrylol terminated polymers having 2,2-dimethyl-4-methylene glutarate structural units in the polymer chain and a weight average molecular weight about above 2,000. Commonly assigned U.S. Pat. No. 4,547,323 relates to specific dimers, namely functionally substituted 2,2-dimethyl-4-methyleneglutaric acid esters and a process for dimerizing the precursor monomers using free radical initiator in the presence of a complex cobalt catalyst for chain transfer to monomer.

EP Application No. 84106050.2 teaches a process for preparing components from malonic esters for paint binders which can be crosslinked by transesterification. Winn and Schnollner (PLASTE UND KAUTSCHUCK 22 (1975), p. 904–906), teach the synthesis of polymeric polyesters of 2-methyleneglutaric acid prepared by transesterification of the corresponding dimethyl ester glutarate with hexanediol as catalyzed with sodium methoxide. Similar polyesters were prepared where the 2-methylene group of the 2-methylene glutarate dimethyl ester was first reacted with cyclopentadiene and then transesterified with hexanediol.

Typical polyesters and paints formulated therewith suffer from susceptibility to hydrolysis. The instant polyesters impart hardness and stability to hydrolysis while maintaining the methylene functionality.

BRIEF SUMMARY OF THE INVENTION

The invention relates to new polyesters having hindered ester linkages and high solids coatings prepared therefrom.

One aspect relates to polyester oligomers containing sterically hindered tertiary ester groups comprising the reaction product of lower alkyl diesters of 2,2-dimethyl-4-methyleneglutaric acid with rigid glycols or polyols under transesterification catalysis.

A further aspect relates to hydrolysis resistant polyester binders useful in high solid coatings which comprise the condensation product of
(a) 5 to 25 weight parts of the dimethyl ester of 2,2-dimethyl-4-methyleneglutaric acid;
(b) 20 to 50 weight parts hindered glycol;
(c) 0 to 18 weight parts of unhindered glycol;
(d) 30 to 50 weight parts of dicarboxylic acid selected from the group consisting of saturated dicarboxylic acid and unsaturated dicarboxylic acid;
wherein (a) and at least a major portion of (b) are first reacted under transesterification catalysts to provide a sterically structured linear polyester oligomer containing tertiary ester linkages and pendant methylene unsaturation along the polymer chain and having a weight average molecular weight of not above 1,500 and said oligomer is further extended by condensation polymerization with (c), (d), and remaining (b); wherein a+b+c+d totals 100%.

A yet further aspect relates to high solids coatings comprising
(a) 40–50 weight percent of a polyester binder containing 5 to 30 weight percent of a lower molecular weight polyester oligomer as described above;
(b) 15–25 weight percent of a pigment grind;
(c) 30–35 weight percent crosslinker adapted to react with available hydroxyl functional groups on said polyesters;
wherein a+b+c totals 100%.

DETAILED DESCRIPTION OF THE INVENTION

The invention relates to novel polyesters derived from 2,2-dimethyl-4-methyleneglutaric acid and their use as hardeners and binders in coatings such as high solids coatings. The novelty of these polyesters reside in part from the hydrolytic stability of the ester derived from the tertiary (t-butyl like) ester portion of the molecule and in part from the selection of rigid or highly branched glycols and/or polyols used in the formation of such polyesters. Preferred polyols are diols having the requisite sterically hindered structure. Diols and polyols are used herein interchangeably. The formation of the desired polyesters may be achieved by a base catalyzed transesterification of lower alkyl diesters of 2,2-dimethyl-4-methyleneglutaric acid with appropriate diols or polyols:

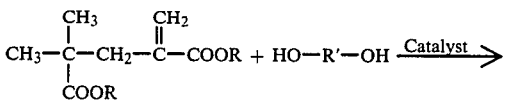

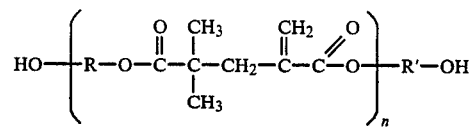

The product of the transesterification is typically a mixture of low molecular weight polyester oligomers represented generally by the above formula where n is an integer from 1 to 5. Such oligomers possess doubly hindered ester functionality, i.e. an ester functionality having alpha,alpha-dimethyl substituents in the one case and having alpha-methylene substitution at the second ester functionality. Although there will be a certain degree of randomness in the oligomer formation, it is believed that the methylene ester will be largely internal to the chain and the alpha,alpha-dimethyl ester will be terminal due to the expected rates of reaction at these hindered positions. While the illustrated polyester is useful in depicting the polyester generally, it is recognized that the actual ester combinations may be a combination of head-to-head, head-to-tail, and tail-to-tail depending on the molar amounts of components and the manner they are introduced into the polymerization. Although the rigidity and hardness of the polyester is determined in part by the 2,2-dimethyl groups adjacent to the ester functionality, it also is influenced by the structure of the polyol or polyol mixture. Hindered polyols in combination with tertiary ester (t-butyl like)

provide the most desired rigid polyesters and the highest degree of hydrolytic stability.

The starting 2,2-dimethyl-4-methyleneglutaric acid or its $C_1$–$C_4$-lower alkyl diesters (DRDMMG) are conveniently prepared as shown in the coassigned U.S. Pat. No. 4,547,323. In some instances it may be desired to hydrolyze the ester to its diacid before subjecting it to an esterification process. The transesterification process using alkaline catalysts such as alkali metal alkoxides and hydroxides proceeds readily in the temperature range of from 130° C. to 210° C. Methyl esters are preferred and the evolution of lower boiling alcohols drives the reaction to completion. While not wishing to be bound to any one structure, applicants for clarification of the invention suggest one or more of the following structures contribute to the polyester oligomer and such structures will depend in part on the choice of polyol, the molar ratios of polyol and DRDMMG, the actual reaction conditions and order of addition of reactants, factors known to those skilled in the art.

hydroxyl bearing carbons of the glycols. Such glycols include the following structures:

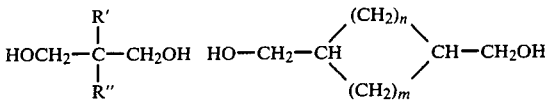

wherein R' and R" are independently lower alkyl, alkylhydroxy groups or hydrogen with the proviso that R' and R" cannot both be hydrogen. The term "glycol" and "polyol" is used interchangeably herein. The preferred glycol for forming the polyester oligomer is neopentyl glycol. Other useful polyols include for example 2-2-diethyl-1,3-propanediol, trimethylolpropane, pentaerythritol, 2-ethyl-1,3-hexanediol, cyclohexanedimethanol, hydrogenated bisphenol A and bisphenol A. Such mixtures are selected to provide the most desirable physical properties of the coatings formulated with the polyesters.

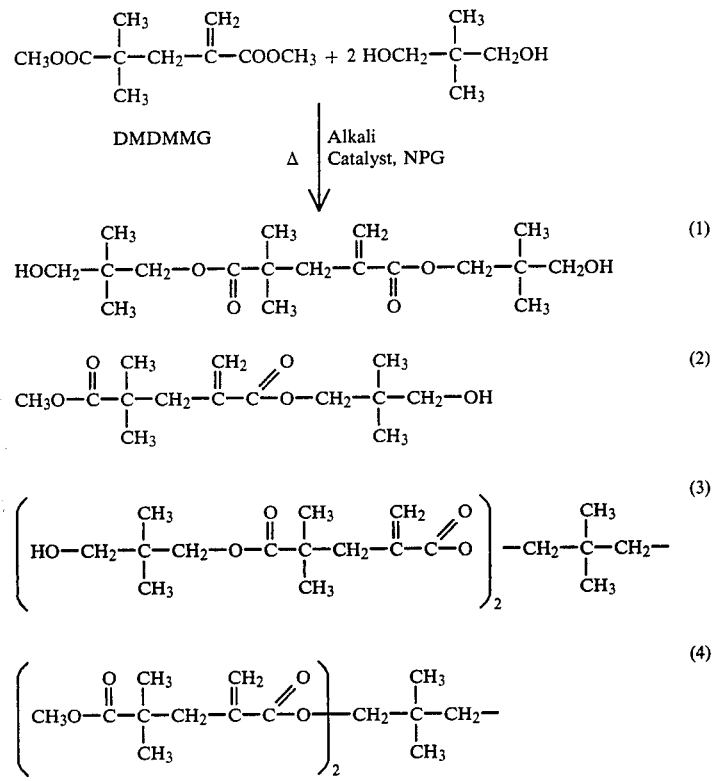

PREPARATION OF THE POLYESTER OLIGOMERS

The instant polyester oligomers and their higher polyester condensates containing tertiary ester linkages are advantageous over the prior art compounds in that they exhibit improved hydrolysis stability due in part to the hindered ester functionality resulting from the 2,2-dimethyl substitution in the glutarate ester. The hydrolysis stability if further enhanced by the use of rigid or hindered polyols which additionally structurally protect the ester functionality. By hindered polyol is meant a polyol wherein the alpha or beta carbons adjacent to the hydroxyl functionality are mono- or di-alkylated. The ester stability and rigidity increase with the type and amount of substitution on the carbon adjacent to the In forming the low molecular weight polyester oligomers, the hindered polyols, those containing at least one alpha lower alkyl group substitution, comprise 55 to 100 weight percent, basis total glycol, and the less hindered polyols comprise 0 to 45 weight percent of the total glycol reacted with the lower dialkyl ester of 2,2-dimethyl-4-methyleneglutaric acid (DRDMMG).

In synthesizing the low molecular weight oligomers, the polyol or mixtures thereof is used in excess over the DRDMMG. Useful ratios polyol/diol can be from 1.8 to 2.5 moles per mole of DRDMMG. Preferred ranges are from 2.0 to 2.3 moles polyol (calculated as diol) such as neopentyl glycol. It is understood that when the hindered diol has a hydroxyl functionality greater than 2 these molar ratios will have to be adjusted to provide the required characteristics of the product.

The transesterification can be performed either neat or in the presence of organic solvents when a temperature moderation is needed. The solvent can be a solvent that azeotropes with the lower alcohol evolved during the transesterification reaction. The transesterification may be performed using typical esterification catalysts; basic catalysts such as for example alkali metal alkoxides and hydroxides are preferred.

The molecular weight of the polyester oligomer can vary with the reactants and reaction conditions, but usually polymers having a molecular weight (weight average) within the range of from about 400 to about 5,000 can be conveniently prepared. Preferred molecular weights for high solids coatings are from about 600 to 1,500 with most preferred being less than 1,000. Table I shows a series of transesterification experiments using DMDMMG and neopentyl glycol and various catalyst types.

PREPARATION OF COATINGS

The above-described polyester oligomers are further reacted with typical polyester starting components to form a condensed, higher molecular weight polyester binder which is used as the principal polymeric binder in the formation of coatings. The structural components of the oligomer will be found in the paint polyester and will contribute hydrolytic stability and rigidity as described for the oligomers. While a high solids coating is exemplified in the best mode Examples, the oligomers and resulting polyesters will be generally useful in a wide variety of coatings.

The polyester binders useful in preparing the coating comprise
(a) 5 to 25 weight parts of the dimethyl ester of 2,2-dimethyl-4-methyleneglutaric acid;
(b) 20 to 50 weight parts hindered glycol;
(c) 0 to 18 weight parts of unhindered glycol;
(d) 30 to 50 weight parts of dicarboxylic acid selected from the group consisting of saturated dicarboxylic acid and unsaturated dicarboxylic acid;
wherein (a) and a major portion of (b) are first reacted under transesterification catalysts to provide a sterically structured linear polyester oligomer containing tertiary ester linkages and pendant methylene unsaturation along the polymer chain and having a weight average molecular weight not above 1,500 and said oligomer is further extended by condensation polymerization with (c), (d), and remaining (b); with a+b+c+d totaling 100% (resin solids basis). The molecular weights of the binder polyester are thus considerably higher than that of the starting oligomer. In this condensation (esterification) step the use of unhindered polyols or glycols is permitted to develop the necessary characteristics both in the polyester and the paints formulated therefrom. These include for example 1,6-hexanediol, ethylene glycol, propylene glycol, 1,3 butylene glycol, and 2-ethyl-1,3-hexanediol, and the like.

Useful dicarboxylic acids for extending the polyester oligomer by further esterification include both saturated dicarboxylic acids and unsaturated dicarboxylic acid. Useful saturated diacids include for example adipic acid, isophthalic acid, terephthalic acid, dodecandionic acid, azelaic acid, trimellitic anhydride, and the like. Useful unsaturated dicarboxylic acids include maleic acid, fumaric acid, and itaconic acid. Preferred acids are isophthalic acid, terephthalic acid, and adipic acid.

Coatings can be readily prepared from these polyester binders in the usual fashion. A typical high solids coating will comprise
(a) 40–50 weight percent of a polyester binder containing 5 to 30 weight percent of polyester oligomer;
(b) 15–25 weight percent of a pigment grind;
(c) 30–35 weight percent crosslinker adapted to react with available hydroxyl functional groups on said polyester;
wherein a+b+c totals 100%.

In addition to providing hydrolysis resistant coatings, the polyester oligomers and polyester binders prepared therefrom are also useful in coatings for their cure properties resulting from the 4-methylene unsaturation. Such entities contribute to air dry polyester and thermosetting polyesters. Coatings formulated with other type monomers, i.e. styrene, can under appropriate catalyst, cure by copolymerization.

TABLE I

PREPARATION OF POLYESTER OLIGOMERS BY TRANSESTERIFICATION OF DMDMMG

| Example Number | Mole NPG[d] / Mole DMDMMG[e] | Catalyst/ Concn. % (W) | Reaction Temperature (°C.) | Reaction Time (hrs.) | Mole MeOH Condensed | $\overline{MW}$ | $\overline{MW}/\overline{MN}$ |
|---|---|---|---|---|---|---|---|
| — | 1.5/0.5 | LiCO$_3$/0.5 | 120~220 | 4.0 | 0 | 321 | 1.2 |
| — | 0.75/0.25 | [a]TIPT/0.3 | 120~220 | 3.5 | 0 | — | — |
| 4 | 1.5/0.5 | NaOCH$_3$/1.0 | 110~195 | 3.5 | 1.00 | 980 | 1.87 |
| — | 1.5/0.5 | [b]Co(AcAc)/1.0 | 120~200 | 3.0 | 0.10 | — | — |
| 7 | 1.5/0.50 | NaOCH$_3$/0.5 18-Crown-6/ 2.4 | 150~190 | 1.0 | 1.00 | 763 | 1.60 |
| — | 1.5/0.52 | NaOCH$_3$/0.5 18-Crown-6/ 0.01 | 160~190 | 2.0 | 1.00 | — | — |
| 5 | 1.5/0.5 | LiOH/0.5 | 110~210 | 6.5 | 1.12 | 774 | 1.55 |
| 8 | 1.5/0.5 | KOH/0.5 | 130~190 | 1.5 | 1.0 | 624 | 1.49 |
| — | 1.5/0.5 | [c]Al(AcAc)/0.5 | 150~190 | 3.5 | 0.4 | — | — |
| — | 1.5/0.54 | KOH/0.25 18-Crown-6/ 0.93 | 180~190 | 5.3 | 0.86 | — | — |
| 6 | 2.0/0.67 | [f]Na—t-BuOCH$_3$/0.5 | 130~200 | 2.3 | 1.21 | 770 | 1.58 |
| — | 1.5/0.5 | [g]K—t-BuOCH$_3$/0.5 | 130~200 | 4.0 | 0.63 | — | — |

TABLE I-continued

PREPARATION OF POLYESTER OLIGOMERS BY TRANSESTERIFICATION OF DMDMMG

| Example Number | Mole $NPG^d$ / Mole $DMDMMG^e$ | Catalyst/ Concn. % (W) | Reaction Temperature (°C.) | Reaction Time (hrs.) | Mole MeOH Condensed | $\overline{MW}$ | $\overline{MW}/\overline{MN}$ |
|---|---|---|---|---|---|---|---|
| — | 1.5/0.5 | $^h$NaOEt/0.5 | 120–200 | 2.0 | 0.71 | — | — |

$^a$TIPT = Tetraisopropyl Titanate. DuPont "Tyzor".
$^b$Co(AcAc) = Cobaltous Acetylacetonate.
$^c$Al(AcAc) = Aluminum Acetylacetonate.
$^d$NPG = Neopentyl Glycol.
$^e$DMDMMG = Dimethyl 2,2-Dimethyl-4-Methyleneglutarate (cf U.S. Pat. No. 4,547,323).
$^f$Na—t-BuOCH$_3$ = Sodium t-Butoxide.
$^g$K—t-BuOCH$_3$ = Potassium t-Butoxide.
$^h$NaOEt = Sodium Ethoxide.

POLYESTER EVALUATIONS

GPC ANALYSIS:

Low molecular weight samples were run on a Varian Micropak TSK 2000H and 3000H at 50° C. in THF with a 1 ml./min. flow rate using a fifth order polynomial to fit the polystyrene molecular weight calibration.

High molecular weight samples were run on a Waters Associates 150° C. ALC/GPC containing 10, 10, 10, 10, 500 and 100 Å styragel columns, at 50° C. in THF with a flow rate of 1 ml./min. using a fourth order polynomial to fit the polystyrene calibration curve.

GC ANALYSIS:

GC analysis was done using a SP-1000, 1% $H_3PO_4$ column with a temperature program consisting of a 10° C./min., raised from 60° to 230° C. followed by a hold for 10 minutes. Pure monomer MMA, dimer and trimer were used as standards.

NMR ANALYSIS:

MNR analysis was done using Perkin-Elmer R12B 60 MHz proton probe. CDCl$_3$ solvent and TMS standard were used.

ATOMIC ABSORPTION:

AA was done using Perkin-Elmer 405 AA Spectrophotometer. Hollow cathode lamp and air acetylene flame were used. Emission wavelength for cobalt at 345.4 nm and sodium at 589.0 nm were used.

The following examples exemplify the invention but should not be construed as limitation. Unless otherwise indicated, all temperatures are given in degrees Centigrade and all percentages are weight percentages.

EXAMPLE 1

Synthesis of Dimethyl 2,2-Dimethyl-4-Methyleneglutarate (DMDMMG)

Methylmethacrylate (MMA), 100 g., and azobisisobutyronitrile (AIBN), 1 g., were charged to a 500 ml. flask and thoroughly flushed with nitrogen. Cobalt(II) acetate hexahydrate, 0.138 g., and dimethylglyoxime, 0.183 g., were added followed by 0.30 ml. of pyridine. The temperature was raised to 90° C. in 30 minutes and a solution of 2.0 g. AIBN in 200 ml. of MMA added over one hour. Following completion of the monomer addition, the solution was held for one hour at which time AIBN, 0.75 g., was added. The solution was held at 90° C. and cooled. Analysis indicated 82 percent conversion of monomer to a product containing 64 percent of the desired dimer, DMDMMG. The DMDMMG was easily purified by fractional distillation.

EXAMPLE 2

Semi-Continuous Process

A process substantially similar to Example 1 with a three-hour monomer addition. Analysis of the final material indicated 80 percent conversion of monomer to a product containing 63 percent DMDMMG. The additional material being comprised substantially of trimer and tetramers of MMA.

EXAMPLE 3

Batch Charged Dimerization of Methyl Methacrylate

Methyl methacrylate (MMA), 1500 g. and ethyl acetate, 1500 g., were charged to a 5-liter flask and thoroughly flushed with nitrogen. Cobalt(II) acetate hexahydrate, 0.44 g., AIBN, 15 g., dimethylglyoxime, 0.38 g., and pyridine, 6 ml. were added. The solution was heated to reflux and held for approximately 2 hours. The crude DMDMMG was distilled through a packed column at 74.2° C. at 1.7 mm., removing an appreciable forecut containing predominantly MMA monomer. A total of 677 g. product was isolated, with a purity of 95 percent.

EXAMPLE 4

Preparation of Polyester Oligomer

DMDMMG, 100 g., and neopentyl glycol, 156 g., were added to a round bottom flask and 2.56 g. sodium methoxide were added. The flask was flushed with nitrogen and heated to 130° C., held to collect approximately 20 ml. methanol, then the temperature was gradually increased to 190° C. until about 40 ml. of methanol were collected. The product was identified by NMR and HPGPC, a dark brown paste-like solid. $\overline{MW}=980$; $\overline{MW}/\overline{MN}=1.87$.

EXAMPLE 5

DMDMMG, 100 g., and neopentyl glycol, 156 g., were added to a round bottom flask and 1.28 g. of lithium hydroxide was added. The temperature was gradually increased from 130° C. to 210° C. until 44 ml. of methanol were collected. The chain-extended polyester was identified by NMR and HPGPC, a golden-yellow paste-like solid. $\overline{MW}=774$; $\overline{MW}/\overline{MN}=1.55$.

EXAMPLE 6

DMDMMG, 133 g., and neopentyl glycol, 207.5 g., were added to a round bottom flask and 1.7 g. of sodium t-butoxide was added. The flask was heated to 130° C. under nitrogen, held to collect approximately 27 m. of methanol, and the temperature was gradually increased to 200° C. until 50 ml. of methanol were collected. The product was identified by NMR and HPGPC, a deep yellow paste-like solid. $\overline{MW}=770$; $\overline{MW}/\overline{MN}=1.58$.

EXAMPLE 7

DMDMMG, 100 g., and neopentyl glycol, 156 g., were added to a round bottom flask and 1.28 g. of sodium methoxide along with 6.26 g. of 18-Crown-6 were added. The flask was heated to 190° C. for 30 minutes, under nitrogen, held to collect approximately 40 ml. of methanol. The product was identified by NMR and HPGPC, a light brown paste-like solid. $\overline{MW}=763$; $\overline{MW}/\overline{MN}=1.60$.

EXAMPLE 8

DMDMMG, 100 g., and neopentyl glycol, 156 g., were added to a round bottom flask and 1.28 g. of KOH pellet was added. The flask was heated to 150° C. for 20 minutes to collect 20 ml. of methanol, and then the temperature was raised to 190° C. for another hour until 40.5 ml. of methanol were collected. The product was identified by NMR and HPGPC. $\overline{MW}=624$; $\overline{MW}/\overline{MN}=1.5$.

EXAMPLE 9

Preparation of Polyester Binder and High Solids Paint

A polyester prepolymer (oligomer) was prepared as described in Example 4 using an excess of neopentyl glycol. Thus, 677 g. of such polyester prepolymer, 336 g. of additional neopentyl glycol, 831 g. isophthalic acid, and 124 g. trimethylolethane were reacted to obtain a branched polyester. The final polyester had a hydroxyl number of 142 and an acid number of 6.8. The resin was diluted to 79% NV in PM acetate. The polyester was formulated into a paint by mixing 40-50 parts of polyester, with 15-25 parts of an acrylic pigment grind and 30-35 parts of a crosslinker, Cymel 1133.

The acrylic grind was composed of 25 parts of conventional acrylic resin, 6.67 parts of a carboxylated acrylic, and 0.10 parts of a leveling agent, 2.42 parts of butyl Carbitol, 2 parts of n-butanol, 90 parts of rutile TiO$_2$ and 4 parts of methyl isobutyl ketone. The paint was applied to Parker B-1000 iron phosphate, cold-rolled steel and cured at 350° F. for 20 minutes. The results are summarized in Tables II and III.

EXAMPLES 10-13

Polyester binders were prepared in a fashion similar to that used for Example 9 except that the overall composition of the 1,6-hexanediol and neopentyl glycol; isophthalic acid, and trimethylol-ethane were varied as shown in Table II. The components are given in weight percentages. With the exception of the two controls the polyester oligomer was first prepared in large quantity as per Example 4 and then aliquots further reacted with the additional components to give the respective polyester binders shown in Examples 10-13. It is noted that although the total components are listed, the polyester oligomer is first prepared from DMDMMG and neopentyl glycol before the remaining components are reacted to give the polyester binder. The properties of the resultant binders are shown in Table II and compared with a commercial polyester used as Control. The two Controls were prepared in a single stage without the polyester prepolymer.

EXAMPLE 14

The polyester binders of Examples 10-13 were formulated into a high solids paint in a manner according to the procedures of Example 9. The pigmented paints were evaulated and compared with the control. The properties are shown in Table III for the panels designated "A" thru "G". Hydrolytic stability improvements are seen in the detergent resistance as compared in Table IV.

TABLE II

| MODIFICATIONS OF RESIN COMMERCIAL POLYESTER RESIN | | | | | | | |
|---|---|---|---|---|---|---|---|
| | Control | | Example No. | | | | |
| | Plant | Lab Control | 10 | 11 | 12 | 9 | 13 |
| DMDMMG | 0 | 0 | 5.6 | 16.0 | 24.0 | 24.5 | 16.4* |
| 1,6-Hexanediol | 17.7 | 17.7 | 17.8 | 10.3 | 6.5 | 0 | 0 |
| Neopentyl Glycol | 23.4 | 23.4 | 23.5 | 20.9 | 19.8 | 27.0 | 41.9 |
| Isophthalic Acid | 49.7 | 49.7 | 43.8 | 44.5 | 41.8 | 42.2 | 39.3 |
| Trimethyloylethane | 9.2 | 9.2 | 9.3 | 8.3 | 7.8 | 6.3 | 2.4 |
| Viscosity** | Z4+ | Y+ | V+ | V− | Z1+ | Z2 | Z1+ |
| NV | 73.4 | 70.0 | 65.7 | 61.3 | 71.9 | 72.6 | 80.2 |
| AN*** | 3.9 | 4.5 | 2.2 | 6.0 | 9.5 | 6.8 | 5.6 |
| % OH | 5.4 | 4.2 | 4.8 | 3.7 | 4.2 | 4.3 | 3.6 |
| Panel | A | B | C | D | E | F | G |

PM Acetate (Dow) was added quantitatively to be 21% of overall weight.
—Mole ratio of functionality OH to COOH is 3:2.
*Crude product of oligomers from MMA by the process of U.S. Pat. No. 4,547,323 and stripped of monomers only.
**Gardner Bubble Viscosity.
***Acid Number.

TABLE III

| PIGMENTED PAINT PROPERTIES PHYSICAL AND CHEMICAL PROPERTIES (340° F. 20 Minutes Bake) | | | | | | | |
|---|---|---|---|---|---|---|---|
| Example No. | Control | Lab Control | 10 | 11 | 12 | 9 | 13 |
| Color[1] Lab | 93.43 | 93.42 | 93.53 | 93.60 | 93.31 | 93.60 | 94.70 |
| a | −0.98 | −1.13 | −0.97 | −1.01 | −1.28 | −0.97 | −0.97 |
| b | −1.52 | −1.41 | −1.39 | −1.38 | −1.13 | −1.07 | −0.20 |
| 60° Gloss[2] | 97 | 96 | 97 | 95 | 94 | 85 | 91 |
| 20° Gloss | 74 | 69 | 71 | 68 | 67 | 58 | 69 |
| Impact (in-lb) | | | | | | | |
| Forward | 28 | 30 | 32 | 30 | 34 | 32 | 30 |
| Reverse | 2 | 3 | 2 | 2 | 3 | 2 | 1 |
| Pencil Hardness | 4H | 4H | 3H+ | 3H | 4H | 3H+ | 4H+ |
| pH after | 3H | 3H | 3H+ | 3H | 2H | 3H | 4H+ |

TABLE III-continued

PIGMENTED PAINT PROPERTIES
PHYSICAL AND CHEMICAL PROPERTIES
(340° F. 20 Minutes Bake)

| Example No. | Control | Lab Control | 10 | 11 | 12 | 9 | 13 |
|---|---|---|---|---|---|---|---|
| 100 MEK rubs Conical Mandrel | 7/8" | 13/8" | 10/8" | 2" | 10/8" | 1" | 2" |
| Tape-off | 5/8" | 1" | 3/4" | 13/16" | 11/16" | 5/8" | 3/4" |
| Salt Spray[3] (500 hrs.) Blister[4] S/N | 6/1 | 5/10 | 7/5 | 6/3 | 6/2 | 7/9 | 6/m |
| Creep | 1/16" | 1/8" | 1/16" | 3/32" | 1/16" | 3/32" | 1/16" |
| % | 100 | 100 | 100 | 90 | 98 | 99 | 50 |

TABLE IV

| | Control | Lab Control | 10 | 11 | 12 | 9 | 13 |
|---|---|---|---|---|---|---|---|
| DETERGENT RESISTANCE OF POLYURES | | | | | | | |
| Blister[4] | | | | | | | |
| Size | 8 | 8.9 | 8.9 | 9.10 | 8 | 8 | 9 |
| Density | 1 | 1/F* | 1/VF** | VF/OK | 2 | 2 | VVF*** |
| Creep (in.) | 1/16 | 1/16 | 1/16 | 1/16 | 1/16 | 1/16 | 1/32" |
| Creep (%) | 3 | 2 | 2 | 1 | 5 | 5 | 40 |
| 2 DAYS WITHOUT PRIMER | | | | | | | |
| Blister | | | | | | | |
| Size | | 6 | | | | 8 | |
| Density | | Medium | | | | 12 | |
| Creep Size (in.) | 1/16 | | | | | 1/32 | |
| Rating (%) | 65 | | | | | 20 | |

*F = Few
**VF = Very Few
***VVF = Very, Very Few.
[1]Hunter Lab Colormeter.
[2]Hunter Lab Glossmeter.
[3]ASTM: B117 test method.
[4]ASTM: D174 test method.
[5]ASTM: D2248 test method.

What is claimed is:

1. A sterically structured linear polyester oligomer containing tertiary ester linkages and pendant methylene unsaturation along the polymer chain and suitable for imparting hydrolytic stability to coatings comprises the reaction product of lower alkyl diester of 2,2-dimethyl-4-methyleneglutaric acid with hindered polyols under transesterification catalysis in a mole ratio of 1.5 to 2.5 moles hindered polyol calculated as difunctional diol per 1.0 mole of diester.

2. The polyester oligomer of claim 1 wherein the ester is dimethyl 2,2-dimethyl-4-methylene glutarate, the hindered polyol is selected from the group consisting of neopentyl glycol, trimethylol propane, 2,2-diethyl-1,3-propanediol, 2-methyl-1,3-propanediol, pentaerythritol, 1,4-cyclohexanedimethanol, bisphenol A and hydrogenated bisphenol A, and the weight average molecular weight of the oligomer is not above 1,500.

3. The polyester of claim 2 wherein the glycol comprises a major proportion of neopentyl glycol.

4. A polyester binder suitable for imparting hydrolytic stability to coatings wherein the polyester comprises the sterically structured linear polyester oligomer of one of claims 1 through 3 further extended by condensation polymerization with additional hindered glycols and non-hindered glycols and dicarboxylic acids selected from unsaturated and saturated dicarboxylic acids.

5. A high solids coating comprising as the major binder the polyester binder of claim 4.

6. A polyester binder of claim 4 comprising the condensation product of
   (a) 5 to 25 weight parts of the dimethyl ester of 2,2-dimethyl-4-methyleneglutaric acid;
   (b) 20 to 50 weight parts hindered glycol;
   (c) 0 to 18 weight parts of unhindered glycol;
   (d) 30 to 50 weight parts of dicarboxylic acid selected from the group consisting of saturated dicarboxylic acid and unsaturated dicarboxylic acid;
wherein (a) and a major portion of (b) are first reacted under transesterification catalysts to provide a sterically structured linear polyester oligomer containing tertiary ester linkages and pendant methylene unsaturation along the polymer chain and having a weight average molecular weight not above 1,500 and said oligomer is further extended by condensation polymerization with (c), (d), and remaining (b); wherein a+b+c+d totals 100%.

7. A high solids coating of claim 5 comprising
   (a) 40–50 weight percent of a polyester binder containing 5 to 30 weight percent of polyester oligomer prepared according to claim 1;
   (b) 15–25 weight percent of a pigment grind;
   (c) 30–35 weight percent crosslinker adapted to react with available hydroxyl functional groups on said polyester;
wherein a+b+c totals 100 percent.

* * * * *